United States Patent
Kagaya et al.

(10) Patent No.: US 12,494,101 B2
(45) Date of Patent: Dec. 9, 2025

(54) NOTIFICATION DEVICE AND NOTIFICATION METHOD

(71) Applicant: Panasonic Intellectual Property Management Co., Ltd., Osaka (JP)

(72) Inventors: Tomoyuki Kagaya, Kanagawa (JP); Yasunobu Ogura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 58 days.

(21) Appl. No.: 18/576,069

(22) PCT Filed: May 9, 2022

(86) PCT No.: PCT/JP2022/019725
§ 371 (c)(1),
(2) Date: Jan. 2, 2024

(87) PCT Pub. No.: WO2023/281909
PCT Pub. Date: Jan. 12, 2023

(65) Prior Publication Data
US 2024/0331477 A1    Oct. 3, 2024

(30) Foreign Application Priority Data
Jul. 9, 2021 (JP) .................................. 2021-114133

(51) Int. Cl.
*G07C 9/37* (2020.01)
*G03B 21/14* (2006.01)
(Continued)

(52) U.S. Cl.
CPC ............... *G07C 9/37* (2020.01); *G03B 21/14* (2013.01); *G06V 40/172* (2022.01); *H04N 5/74* (2013.01); *H04N 9/31* (2013.01)

(58) Field of Classification Search
CPC ........ G07C 9/37; G03B 21/14; G06V 40/172; G06V 20/52; G06V 40/161; H04N 5/74; H04N 9/31; H04N 7/18
See application file for complete search history.

(56) References Cited

U.S. PATENT DOCUMENTS

2011/0293148 A1  12/2011  Kobayashi
2021/0409396 A1* 12/2021  Funayama ............... H04L 63/20
2023/0116514 A1   4/2023  Akutsu et al.

FOREIGN PATENT DOCUMENTS

JP    2009-093371    4/2009
JP    2020-080127    5/2020
(Continued)

OTHER PUBLICATIONS

International Search Report issued in International Pat. Appl. No. PCT/JP2022/019725, dated Jul. 19, 2022, along with an English translation thereof.
(Continued)

*Primary Examiner* — James J Yang
(74) *Attorney, Agent, or Firm* — GREENBLUM & BERNSTEIN, P.L.C.

(57) ABSTRACT

This notification device has: a generation unit for generating image data of a face authentication result image that represents the face authentication result of a person passing through a passage control area and that is projected at the feet of the person passing through the passage control area, the face authentication result being obtained on the basis of image data from a camera imaging the passage control area; and a transmission unit for transmitting the generated image data to a projector.

9 Claims, 7 Drawing Sheets

(51) Int. Cl.
  *G06V 40/16* (2022.01)
  *H04N 5/74* (2006.01)
  *H04N 9/31* (2006.01)

(56) References Cited

FOREIGN PATENT DOCUMENTS

| WO | 2020/105142 | 5/2020 |
| WO | 2021/199234 | 10/2021 |
| WO | 2022/003852 | 1/2022 |

OTHER PUBLICATIONS

Extended European Search Report (EESR) from European Patent Office (EPO) in European Patent Appl. No. 22837330.4, dated Sep. 13, 2024.

* cited by examiner

NOTIFICATION DEVICE AND NOTIFICATION METHOD

TECHNICAL FIELD

The present disclosure relates to a notification apparatus and a notification method.

BACKGROUND ART

A face authentication apparatus is used, for example, to manage entry to and exit from an office or the like. For example, a face authentication apparatus receives image data from a camera that captures an image of the area around a gate provided at an entrance/exit to an office or the like. The face authentication apparatus compares the face image of a person included in the received image data with a registered face image, and controls opening and closing of the gate.

It is possible to use such a face authentication apparatus at the entrance/exit (passage management area) of a concert venue or the like where more people pass through at the same time than the entrance/exit of an office or the like.

Patent Literature (hereinafter, referred to as PTL) 1 discloses a biometric verification apparatus that can efficiently monitor the results of biometric authentication processing and provide manual control instructions to each apparatus.

CITATION LIST

Patent Literature

PTL 1
Japanese Patent Application Laid-Open No. 2009-93371

SUMMARY OF INVENTION

When a gate is installed in a passage management area where many people pass through at the same time, and face authentication processing is performed by using a face authentication apparatus, the passage management area may become crowded. Therefore, there is a demand for a notification apparatus that can appropriately notify a person passing through the passage management area of the face authentication result without having to provide a gate in the passage management area.

Non-limiting examples of the present disclosure facilitate providing a notification apparatus and notification method both capable of appropriately notifying people passing through a passage management area, where many people pass through at the same time, of face authentication results without having to provide a gate in the passage management area.

A notification apparatus according to an embodiment of the present disclosure includes: a generator that generates image data of a face authentication result image to be projected onto a vicinity of a foot of a person passing through a passage management area, the face authentication result image representing a face authentication result of the person passing through the passage management area, the face authentication result being obtained based on image data from a camera capturing an image of the passage management area; and a transmitter that transmits the generated image data to a projector.

A notification method according to an embodiment of the present disclosure includes: generating image data of a face authentication result image to be projected onto a vicinity of a foot of a person passing through a passage management area, the face authentication result image representing a face authentication result of the person passing through the passage management area, the face authentication result being obtained based on image data from a camera capturing an image of the passage management area; and transmitting the generated image data to a projector.

It should be noted that general or specific embodiments may be implemented as a system, an apparatus, a method, an integrated circuit, a computer program, or a storage medium, or any selective combination of a system, an apparatus, a method, an integrated circuit, a computer program, and a storage medium.

According to an embodiment of the present disclosure, face authentication results can be appropriately notified to people passing through a passage management area, where many people pass through at the same time, of the face authentication result without having to provide a gate in the passage management area.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Embodiments of the present invention will be described below in detail with reference to the accompanying drawings as appropriate. It is, however, noted that a description made in detail more than necessary is omitted in some cases. For example, a detailed description of an already well-known item and a duplicate description of substantially the same configuration are omitted in some cases. The reason for this is to prevent the following description from being unnecessarily redundant and allow a person skilled in the art to readily understand the present disclosure.

The accompanying drawings and the following descriptions are provided to allow a person skilled in the art to fully understand the present disclosure and are not intended to limit the subject set forth in the appended claims.

Figure 1:
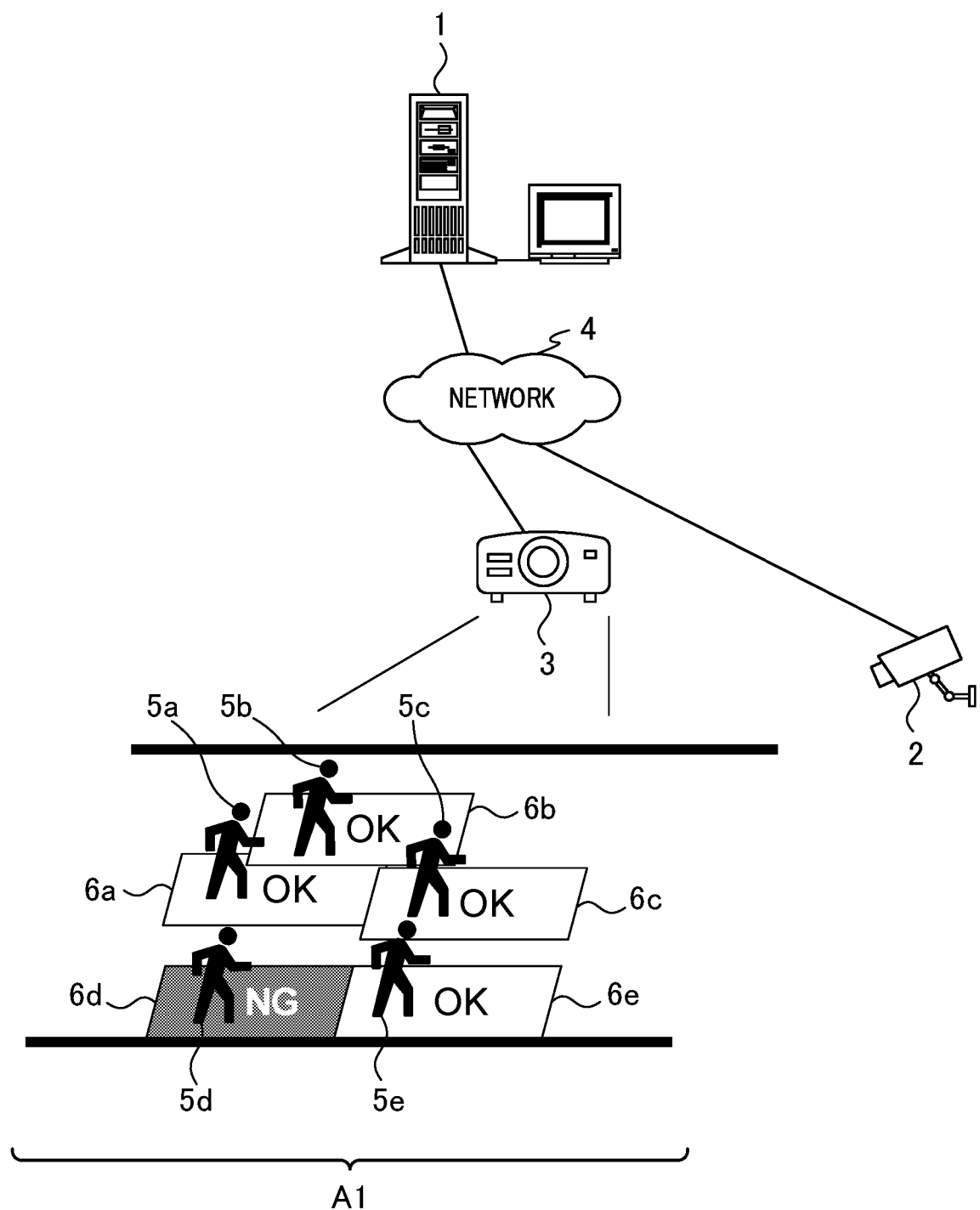
FIG. 1 illustrates an exemplary configuration of a face authentication system according to an embodiment of the present disclosure.

FIG. 1 illustrates an exemplary configuration of a face authentication system according to an embodiment of the present disclosure. As illustrated in FIG. 1, the face authentication system includes face authentication apparatus 1, camera 2, and projector 3.

FIG. 1 also illustrates network 4 in addition to the face authentication system. Network 4 is, for example, a local area network (LAN) or the Internet.

In addition, FIG. 1 illustrates people 5a to 5e passing through passage management area A1. Passage management area A1 is, for example, the entrance of a facility such as a concert venue, and is an area where passage of people is managed (restricted) by a face authentication system. Hereinafter, when people 5a to 5e are not distinguished from each other, they may be simply referred to as person (or people) 5.

Face authentication apparatus 1 receives image data from camera 2 via network 4. Face authentication apparatus 1 performs face authentication processing for person 5 based on the face image of person 5 included in the received image data. Face authentication apparatus 1 generates image data indicating the face authentication result of person 5, and transmits the generated image data to projector 3 via network 4. Face authentication apparatus 1 may be, for example, an information processor such as a personal computer or a server.

Camera 2 captures an image (herein, image may be a moving image or the like) of passage management area A1. Camera 2 transmits image data of the captured image to face authentication apparatus 1 via network 4. For example, a compound-eye camera that allows face authentication apparatus 1 to measure the distance (position) of person 5 may be used as camera 2.

Projector 3 receives image data indicating the face authentication result of person 5 from face authentication apparatus 1 via network 4. Projector 3 projects face authentication result images 6a to 6e indicating the face authentication results onto the vicinity of the feet of people 5 respectively (onto the floor of passage management area A1), based on the image data received from face authentication apparatus 1 (herein, "projector 3 projecting an image onto the vicinity of the feet of a person" may also mean "projector 3 projecting an image onto the feet of the person").

Face authentication result image 6a of "OK" projected onto the vicinity of the feet of person 5a illustrated in FIG. 1 indicates that face authentication apparatus 1 has determined that person 5a is valid. Face authentication result image 6b of "OK" projected onto the vicinity of the feet of person 5b indicates that face authentication apparatus 1 has determined that person 5b is valid. Face authentication result image 6c of "OK" projected onto the vicinity of the feet of person 5c indicates that face authentication apparatus 1 has determined that person 5c is valid. Face authentication result image 6e of "OK" projected onto the vicinity of the feet of person 5e indicates that face authentication apparatus 1 has determined that person 5e is valid.

On the other hand, face authentication result image 6d of "NG" projected onto the vicinity of the feet of person 5d in FIG. 1 indicates that the face authentication apparatus 1 has determined that person 5d is invalid.

"Valid" may mean, for example, that passage through passage management area A1 is permitted. In addition, "valid" may mean, for example, that the face image of person 5 passing through passage management area A1 matches the face image registered in face authentication apparatus 1.

"Invalid" may mean, for example, that passage through passage management area A1 is not permitted. In addition, "invalid" may mean, for example, that the face image of person 5 passing through passage management area A1 does not match the face image registered in face authentication apparatus 1.

Whether or not person 5 is permitted to pass through passage management area A1 does not necessarily match the determination as to whether or not the face image of person 5 matches the registered face image. For example, the following case is possible: the face image of person 5 passing through matches the registered face image but person 5 is not permitted to pass when, for example, the lookout for people on a watch list is being performed. Therefore, the operator of face authentication system may be able to appropriately set how a determination result is judged to be valid or invalid.

Hereinafter, when face authentication result images 6a to 6e are not distinguished from each other, they may be simply referred to as face authentication result image (or face authentication result images) 6.

Face authentication result image 6 is not limited to the example of FIG. 1. "Valid" and "invalid" may be represented by characters other than "OK" and "NG." In addition, "valid" and "invalid" may be represented (or differentiated) by color. For example, "valid" may be represented by a green face authentication result image 6, and "invalid" may be represented by a red face authentication result image 6. "Valid" and "invalid" may be represented by different image shapes such as "○" and "x," or may be represented as a moving image. In addition, "valid" and "invalid" may be represented by any combination of text, colors, shapes, and moving images.

Figure 2:
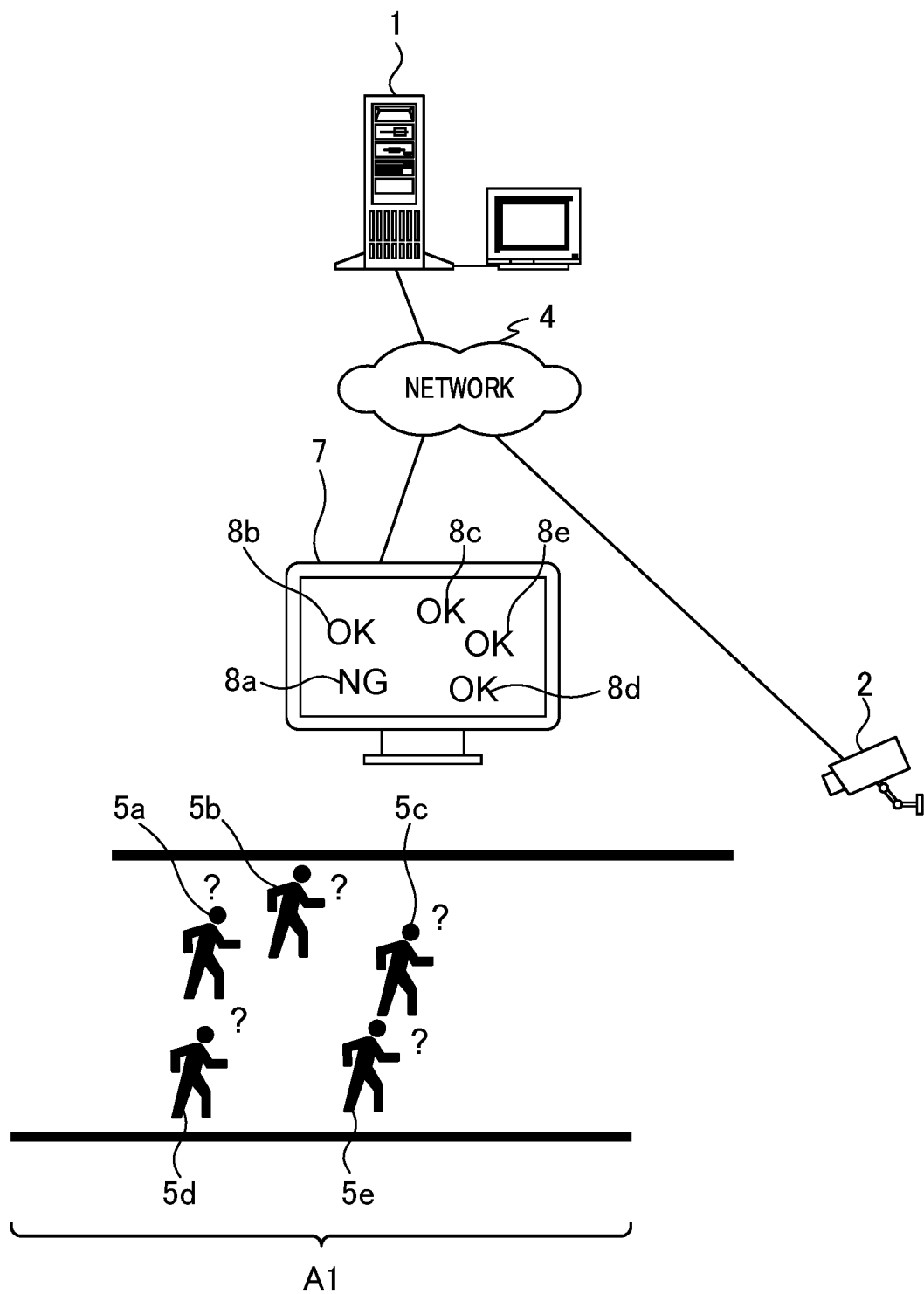
FIG. 2 illustrates an exemplary configuration of another face authentication system.

FIG. 2 illustrates an exemplary configuration of another face authentication system. In FIG. 2, the same component elements as in FIG. 1 are given the same reference numerals. The face authentication system illustrated in FIG. 2 includes display 7 in place of projector 3 in FIG. 1 described above.

Face authentication apparatus 1 in FIG. 2 displays the face authentication result for each person 5 on display 7. For example, face authentication apparatus 1 displays face authentication results for people 5 on display 7 in correspondence with the positional relationship between people 5 when viewing passage management area A1 from above.

For example, face authentication result image 8a of "NG" displayed on display 7 in FIG. 2 indicates the face authentication result of person 5a. Face authentication result image 8b of "OK" displayed on display 7 indicates the face authentication result of person 5b. Face authentication result image 8c of "OK" displayed on display 7 indicates the face authentication result of person 5c. Face authentication result image 8d of "OK" displayed on display 7 indicates the face authentication result of person 5d. Face authentication result image 8e of "OK" displayed on display 7 indicates the face authentication result of person 5e.

Hereinafter, when face authentication result images 8a to 8e are not distinguished from each other, they may be simply referred to as face authentication result image (or face authentication result images) 8.

In the face authentication system illustrated in FIG. 2, face authentication results are displayed on display 7 in correspondence with the positional relationship between people 5 in passage management area A1; thus, it is difficult to intuitively understand which face authentication result corresponds to which person 5's face authentication result. Therefore, even when person 5 looks at the face authentication results displayed on display 7, it is difficult for person 5 to immediately recognize which face authentication result is his or her own. Further, it is also difficult for an administrator, such as a security guard, who manages passage through passage management area A1 to immediately recognize the face authentication results of people 5.

In contrast, in face authentication system illustrated in FIG. 1, the individual face authentication results of people 5 are projected onto the vicinity of the feet of respective people 5. Therefore, person 5 can easily recognize his or her face authentication result.

In addition, an administrator who manages passage through passage management area A1 can also easily recognize the face authentication results of people 5. For example, the administrator can easily recognize person 5d who has been determined to be invalid, and can prevent this person 5d from passing through passage management area A1.

Figure 3:
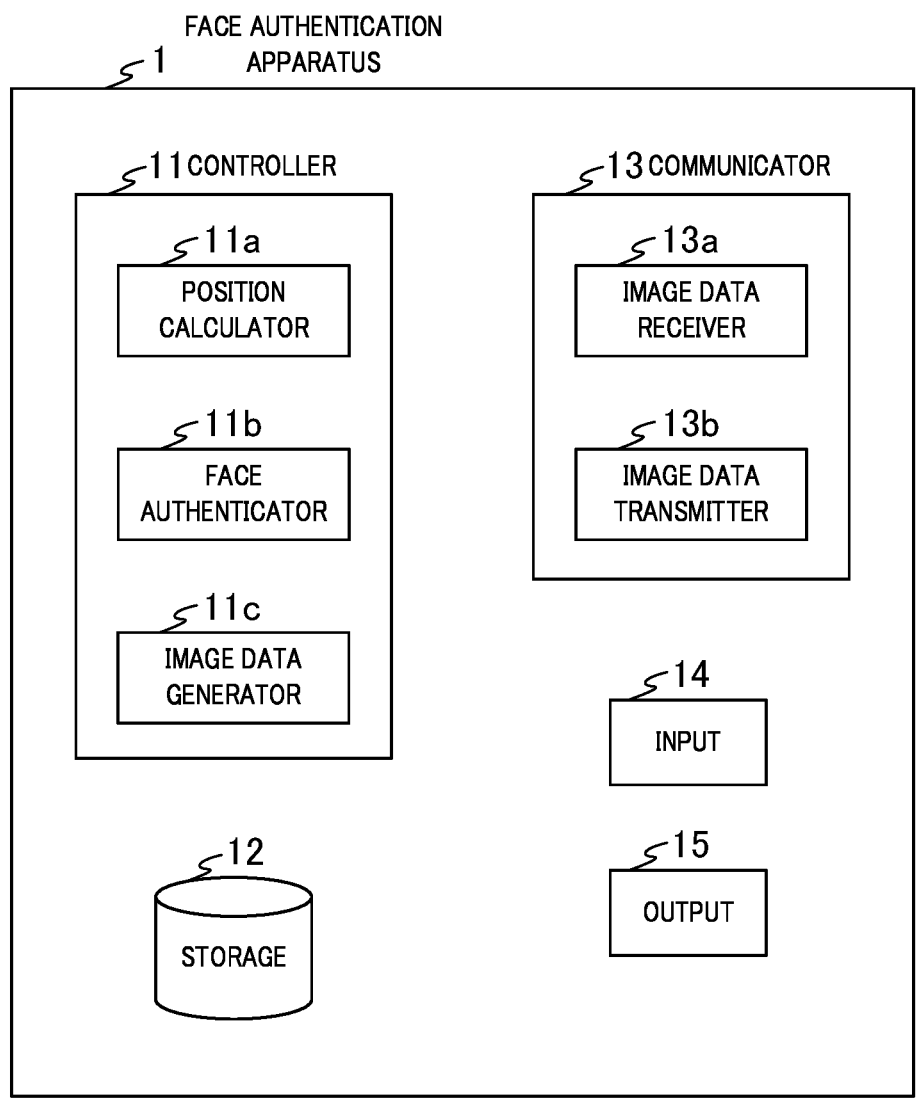
FIG. 3 illustrates an exemplary block configuration of a face authentication apparatus.

FIG. 3 illustrates an exemplary block configuration of face authentication apparatus 1. As illustrated in FIG. 3, face authentication apparatus 1 includes controller 11, storage 12, communicator 13, input 14, and output 15.

Controller 11 controls the entire face authentication apparatus 1. Controller 11 may be configured by, for example, a processor such as a central processing unit (CPU).

Controller 11 includes position calculator 11a, face authenticator 11b, and image data generator 11c. For example, controller 11 may execute a program stored in storage 12 to achieve the functions of position calculator 11a, face authenticator 11b, and image data generator 11c.

Position calculator 11a calculates the position of person 5 (included in the image data) in passage management area A1, based on the image data from camera 2.

Face authenticator 11b performs face authentication on person 5 based on the image data from camera 2. For example, face authentication apparatus 1 compares the face image data of person 5 included in the image data from camera 2 with the face image data stored in advance in storage 12, and determines whether person 5 is valid or not.

Specifically, face authenticator 11b calculates the degree of matching between the face image data of person 5 included in the image data from camera 2 and the face image data stored in advance in storage 12. Face authenticator 11b determines that person 5 is valid when the calculated degree of matching is equal to or higher than a threshold. Face authenticator 11b determines that person 5 is invalid when the calculated degree of matching is less than the threshold.

Image data generator 11c generates image data for projecting the face authentication result onto the vicinity of the feet of person 5 (onto the floor of the passage management area A1), based on the position of person 5 calculated by position calculator 11a and the face authentication result by face authenticator 11b.

For example, image data generator 11c calculates the projection position of the face authentication result to be projected onto the vicinity of the feet of person 5 from projector 3, based on the position of person 5 in passage management area A1 calculated by position calculator 11a. In addition, image data generator 11c determines face authentication result image 6 to be projected onto the vicinity of the feet of person 5, based on the face authentication result by face authenticator 11b. For example, face authentication apparatus 1 determines face authentication result image 6 including the text "OK" or face authentication result image 6 including the text "NG" as illustrated in FIG. 1, based on the face authentication result by face authenticator 11b. Image data generator 11c then generates image data for projecting the determined face authentication result image 6 at the calculated projection position.

When one projector 3 is in charge of the entire passage management area A1, face authentication result image 6 is disposed only at the coordinates corresponding to the area onto the vicinity of the feet of person 5, and the other parts are expressed as a black image, in the image data. In addition, when a plurality of projectors 3 work together to be in charge of passage management area A1, each projector 3 generates an image corresponding to the range covered by the projector.

Storage 12 stores programs for controller 11 to operate. Storage 12 also stores data for controller 11 to perform calculation processing and to control each processor. For example, storage 12 stores face image data of people 5 who have permission to enter or leave a facility such as a concert venue.

Communicator 13 is connected to network 4. Communicator 13 communicates with camera 2 via network 4. Communicator 13 communicates with projector 3 via network 4.

Communicator 13 includes image data receiver 13a and image data transmitter 13b. Image data receiver 13a receives image data from camera 2. Image data transmitter 13b transmits the image data generated by image data generator 11c to projector 3.

Input 14 is connected to, for example, an input device such as a keyboard or a touch panel. Input 14 outputs a signal received from the input device to controller 11.

Output 15 is connected to, for example, a display device such as a display or a touch panel. Output 15 outputs a signal received from controller 11 to the display device.

Figure 4:
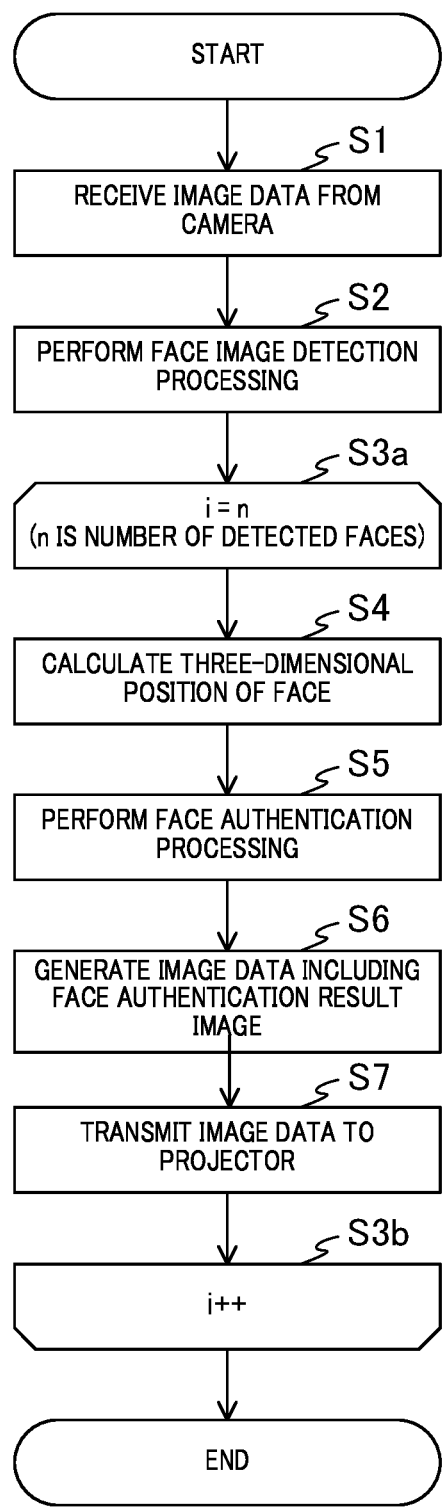
FIG. 4 is a flowchart illustrating an exemplary operation of the face authentication apparatus.

FIG. 4 is a flowchart illustrating an exemplary operation of face authentication apparatus 1. Face authentication apparatus 1 repeatedly executes the processing in the flowchart illustrated in FIG. 4.

Face authentication apparatus 1 receives image data from camera 2 (S1). The received image data includes an image of passage management area A1.

Face authentication apparatus 1 detects face image data from the received image data (S2). That is, face authentication apparatus 1 detects the face image of person 5 passing through passage management area A1.

Face authentication apparatus 1 repeats the processing of S4 to S7 for the number n of detected face images (S3a, S3b).

Face authentication apparatus 1 extracts one face image from the n detected face images, and calculates the three-dimensional position of the face (of the extracted face image) in passage management area A1 (S4).

Face authentication apparatus 1 performs face authentication processing on the face image extracted in S4 (S5).

Face authentication apparatus 1 calculates the projection position of face authentication result image 6 to be projected onto the vicinity of the feet of person 5, whose face image is extracted in S4, based on the three-dimensional position calculated in S4. In addition, face authentication apparatus 1 determines face authentication result image 6 to be projected onto the vicinity of the feet of person 5 based on the face authentication result in S5. Face authentication apparatus 1 then generates image data for projecting the determined face authentication result image 6 at the calculated projection position (S6).

Face authentication apparatus 1 transmits the image data generated in S6 to projector 3 (S7).

Projector 3 projects an image based on the image data transmitted in S7. As a result, face authentication result image 6 indicating the face authentication result of person 5 is projected onto the vicinity of the feet of person 5, as illustrated in FIG. 1.

As described above, image data receiver 13a of face authentication apparatus 1 receives image data from camera 2 capturing an image of passage management area A1. Face authenticator 11b performs face authentication processing on person 5 passing through passage management area A1 based on the image data received by image data receiver 13a. Image data generator 11c generates image data of face authentication result image 6, which is to be projected onto the vicinity of the feet of the person passing through passage management area A1 and represents the face authentication result of the face authentication processing. Image data transmitter 13b transmits the image data generated by image data generator 11c to projector 3. That is, face authentication apparatus 1 uses projector 3 to project face authentication result image 6, representing the face authentication result of the face authentication processing, onto the vicinity of the feet of a person passing through passage management area A1.

This configuration allows face authentication apparatus 1 to appropriately notify people 5 passing through passage management area A1, where many people pass through at the same time, of face authentication results without having to provide a gate in passage management area A1. In addition, face authentication apparatus 1 can appropriately notify an administrator, who manages passage through passage management area A1, of the face authentication results.

Variation 1

As the density of people 5 passing through passage management area A1 increases (as passage management area A1 becomes more crowded), it becomes difficult to recognize face authentication result images 6 for person 5 passing through passage management area A or an administrator managing passage through passage management area A1. With respect to such a difficulty, face authentication apparatus 1 stops projecting face authentication result image 6 indicating that the face authentication result is "valid," and projects only face authentication result image 6 indicating "invalid" when the number of people 5 passing through passage management area A1 exceeds a threshold.

Figure 5:
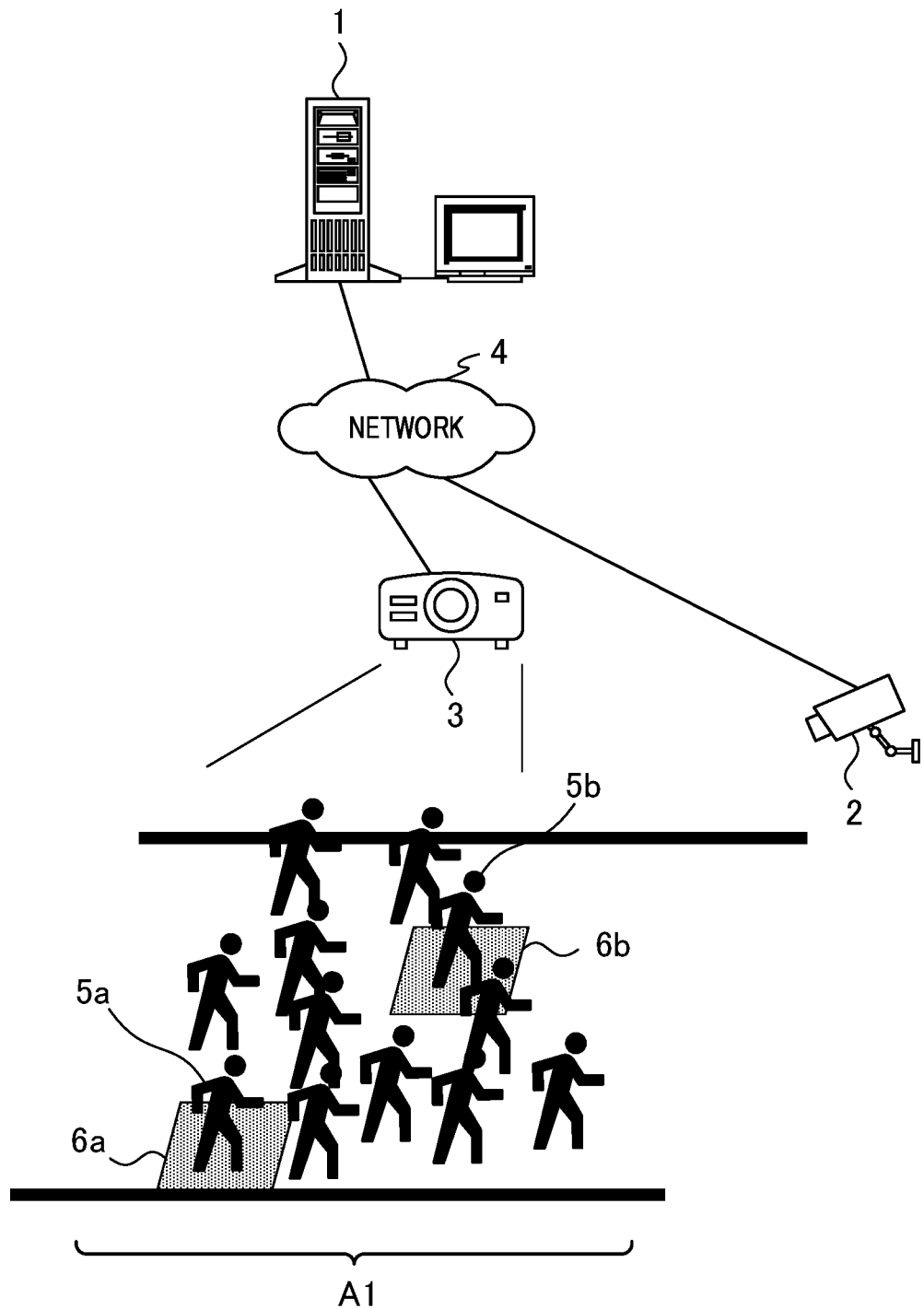
FIG. 5 illustrates an exemplary projection of a face authentication result image (i.e., an image indicating a face authentication result) according to variation 1.

FIG. 5 illustrates an exemplary projection of face authentication result images 6 according to variation 1. In FIG. 5, the same component elements as in FIG. 1 are given the same reference numerals.

FIG. 5 illustrates an example where the number of people 5 passing through passage management area A1 exceeds a threshold. The threshold may be 8, for example. People 5a and 5b illustrated in FIG. 5 are people who are determined to be invalid by face authentication apparatus 1. The people other than people 5a and 5b are people who are determined to be valid by face authentication apparatus 1.

As described above, when the number of people 5 passing through passage management area A1 exceeds a threshold, face authentication apparatus 1 projects only face authentication result image 6 indicating that the face authentication result is "invalid." Therefore, face authentication apparatus 1 projects only face authentication result images 6a and 6b indicating that the face authentication results are "invalid" onto the vicinity of the feet of people 5a and 5b who are determined to be invalid in the face authentication processing, and does not project any face authentication result image onto the vicinity of the feet of the people who are determined to be valid in the face authentication processing.

Face authentication apparatus 1 also projects face authentication result image 6 indicating that the face authentication result is "valid" when the number of people 5 passing through passage management area A1 becomes less than or equal to the threshold. Therefore, when the number of people 5 passing through passage management area A1 becomes less than or equal to the threshold, face authentication apparatus 1 projects face authentication result images onto the vicinity of the feet of all the people 5 passing through passage management area A1, as illustrated in FIG. 1.

Figure 6:
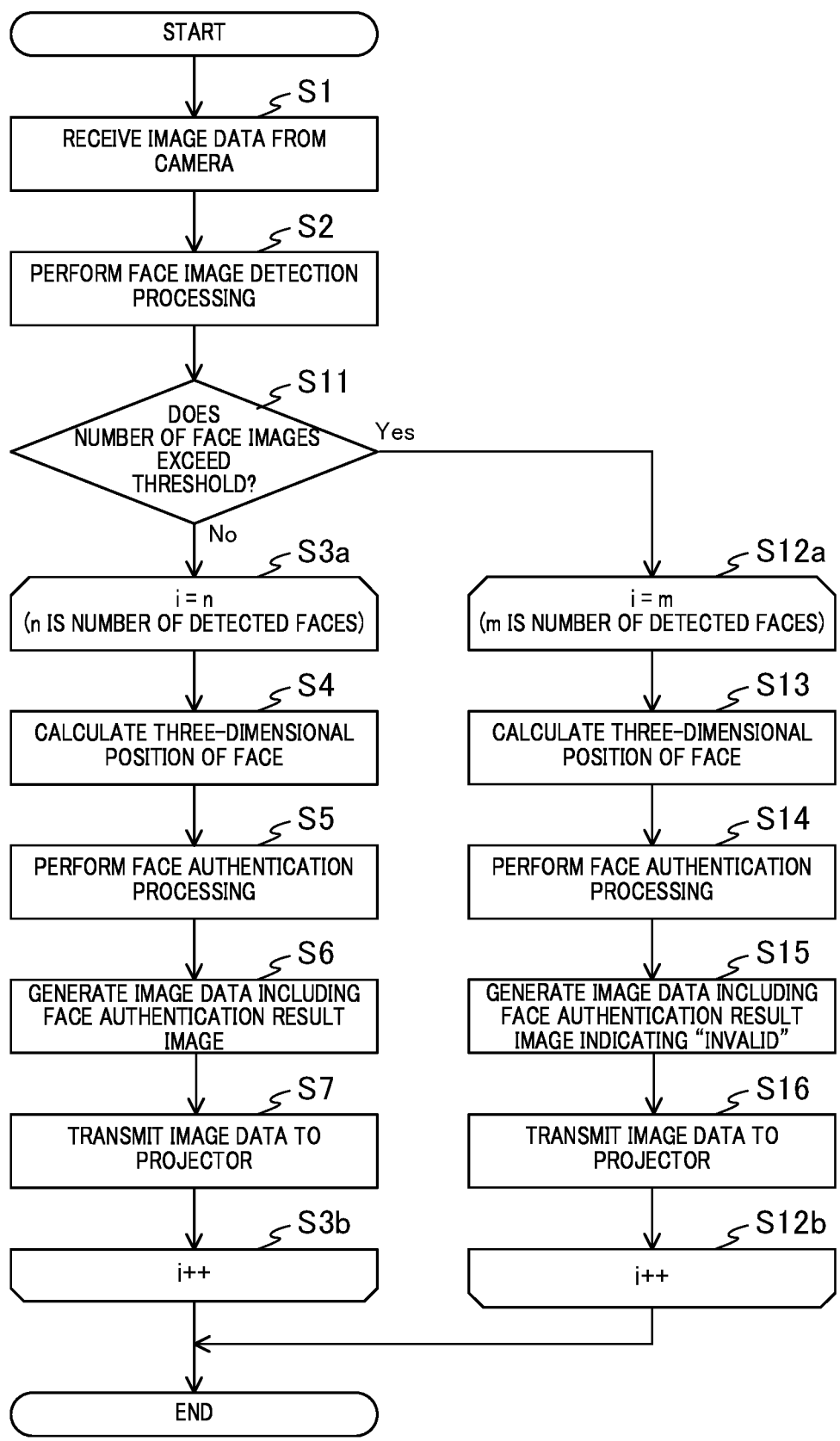
FIG. 6 is a flowchart illustrating an exemplary operation of an face authentication apparatus according to variation 1.

FIG. 6 is a flowchart illustrating an exemplary operation of face authentication apparatus 1 according to variation 1. In FIG. 6, the same processing steps as in FIG. 4 are given the same reference numerals. Processing different from the processing in FIG. 4 will be described below.

After performing face image detection processing in S2, face authentication apparatus 1 determines whether the number of face images detected in S2 exceeds a threshold (S11). That is, face authentication apparatus 1 determines whether the number of people 5 passing through passage management area A1 exceeds a threshold.

When face authentication apparatus 1 determines in S11 that the number of face images detected in S2 does not exceed the threshold ("No" in S11), the processing proceeds to S3a. The processing of S3a, S3b, and S4 to S7 illustrated in FIG. 6 are the same as those of S3a, S3b, and S4 to S7 illustrated in FIG. 4 described above, and the description thereof will be omitted.

When face authentication apparatus 1 determines in S11 that the number of face images detected in S2 exceeds the threshold ("Yes" in S11), face authentication apparatus 1 repeats the processing of S13 to S16 for the number m of face images detected in S2 (S12a, S12b).

Face authentication apparatus 1 extracts one face image from the m detected face images, and calculates the three-dimensional position of the face (of the extracted face image) in passage management area A1 (S13).

Face authentication apparatus 1 performs face authentication processing on the face image extracted in S13 (S14).

When face authentication apparatus 1 determines in the face authentication processing of S14 that person 5 whose face image is extracted in S13 is invalid, face authentication apparatus 1 calculates the projection position of face authentication result image 6 to be projected onto the vicinity of the feet of person 5 determined to be invalid, based on the three-dimensional position calculated in S13. Face authentication apparatus 1 then generates image data for projecting face authentication result image 6, indicating that the face authentication results is "invalid," at the calculated projection position (S15).

Face authentication apparatus 1 transmits the image data generated in S15 to projector 3 (S16).

Projector 3 projects an image based on the image data transmitted in S16 onto the floor of passage management area A1. As a result, as illustrated in FIG. 5, face authentication result image 6 indicating that the face authentication results is "invalid" is projected onto the vicinity of the feet of person 5 who is determined to be invalid as the result of face authentication, and face authentication result image 6 is not projected onto the vicinity of the feet of person 5 who is determined to be valid as the result of face authentication. This configuration can reduce the number of images to be projected; therefore, even when the density of passage management area A1 increases, it is more likely that there is enough space for projecting images.

In addition, while face authentication result image 6 is not projected onto the vicinity of the feet of person 5 who is determined to be valid as the result of face authentication in the present variation, the opposite is also possible, that is, face authentication result image 6 is not projected onto the vicinity of the feet of person 5 who is determined to be invalid. The control of which image, "valid," or "invalid," is not projected may be appropriately set depending on the bias of the determination results and the degree of importance. For example, in an environment where most of people 5 are permitted to pass through, such as an office entrance, or in an environment where person 5 who is determined to be invalid should be especially looked out, it is more beneficial to control so as not to project face authentication result image 6 indicating "valid." Alternatively, in an environment where most people are refused passage, such as on the way to a room where valuables are stored or to a VIP room, it is more beneficial to control so as not to project face authentication result image 6 indicating "invalid."

In the present variation, face authentication result image 6 is controlled not to be projected onto the vicinity of the feet of person 5 who is determined to be valid, on the condition that the density of passage management area A1 increases. However, regardless of the density of passage management area A1, projection of face authentication result image 6 of either the valid or invalid result may be omitted. This configuration can reduce the number of people for whom an image is projected; thus, it is possible to prevent excessive notifications from being given to people 5.

As described above, face authentication apparatus 1 determines whether to generate image data of face authentication result image 6 of person 5 who is determined to be valid in the face authentication processing, based on the degree of crowding of people 5 passing through passage management area A1. When passage management area A1 is crowded, face authentication apparatus 1 does not generate image data of the face authentication result image of person 5 determined to be valid, and face authentication apparatus 1 generates image data of the face authentication result image of person 5 determined to be invalid and projects only face authentication result image 6 indicating that the face authentication result is "invalid" at his or her feet.

This configuration allows person 5 passing through passage management area A1 to easily recognize the face authentication result even when passage management area A1 is crowded. An administrator managing passage through passage management area A1 can also recognize the face authentication results even when passage management area A1 is crowded.

In addition, when passage management area A1 is crowded, face authentication apparatus 1 projects face authentication result image 6 indicating "invalid," not face authentication result image 6 indicating "valid." By this configuration, an administrator managing passage through passage management area A1 can thus easily prevent a person determined to be invalid from passing through.

Variation 2

Face authentication apparatus 1 may allow face authentication result image 6 of person 5 determined to be valid to include an image indicating a course (destination) after person 5 passes through passage management area A1.

For example, face authentication apparatus 1 may allow face authentication result image 6 of person 5 determined to be valid to include a text image such as "Turn right ahead" or "Turn left ahead." In addition, face authentication apparatus 1 may allow face authentication result image 6 of person 5 determined to be valid to include an image of a right turn arrow or a left turn arrow. In addition, face authentication apparatus 1 may allow face authentication result image 6 of person 5 determined to be valid to include a text image such as "Please go to the conference room on the second floor."

For including an image indicating a course after passing through passage management area A1 in face authentication result image 6 of person 5 determined to be valid as described above, storage 12 stores image data indicating a course after passing through passage management area A1 in association with face image data stored (registered) in advance. When face authentication apparatus 1 determines that person 5 is valid in the face authentication processing, face authentication apparatus 1 acquires image data that indicates the course after passing through passage management area A1 and is stored in association with the face image data of this person 5. Face authentication apparatus 1 then generates image data of face authentication result image 6 including an image of the acquired image data, and transmits the image data to projector 3.

This configuration allows person 5 determined to be valid to easily move to an appropriate location after passing through passage management area A1. For example, at a concert venue, person 5 can easily move to the reserved seat.

In addition, face authentication apparatus 1 may allow face authentication result image 6 of person 5 determined to be invalid to include an image indicating the reason why the person is determined to be invalid.

In addition, face authentication apparatus 1 may allow face authentication result image 6 of person 5 determined to be invalid to include an image indicating the course after passing through passage management area A1. In this case, face authentication apparatus 1 may include images indicating different courses for person 5 determined to be valid and person 5 determined to be invalid. For example, in the case of a concert venue, it is conceivable to guide person 5 determined to be valid to the reserved seat, and person 5 determined to be invalid to a counter where an attendant is present or a security room.

For example, when person 5's face is hidden by the person in front of person 5, and thus a face image of person 5 cannot be obtained, resulting in failure of face authentication processing, face authentication apparatus 1 may allow face authentication result image 6 to include a text image such as "Please move away from the person in front of you who is hiding your face."

When face authentication apparatus 1 cannot perform the face authentication processing because person 5 is wearing sunglasses, face authentication apparatus 1 may allow face authentication result image 6 to include a text image such as "Please take off your sunglasses."

As a result, person 5 who should be determined to be valid but is determined to be invalid can take an appropriate measure to be determined to be valid, and thus can pass through passage management area A1.

Variation 3

In addition to projector 3, face authentication apparatus 1 may display the face authentication results, for example, on a display installed at a location other than passage management area A1, such as a security room. For example, face authentication apparatus 1 may display the face authentication result together with the image captured by camera 2 on the display. For example, the face authentication result image may be displayed onto the vicinity of the feet of person 5 shown in the image captured by camera 2.

When a face authentication result image is displayed on a display as described above, face authentication result image 6 projected by projector 3 may differ from the face authentication result image displayed on the display. In other words, face authentication result image 6 to be notified to person 5 may differ from the face authentication result image to be notified to a security guard.

For example, face authentication apparatus 1 may include a text image "OK" in face authentication result image 6 to be notified to person 5 and may include an image of information such as the name and destination of person 5 in the face authentication result image to be notified to the security guard (displayed on the display).

In addition, a correct face authentication result may be reflected in the face authentication result image to be notified to a security guard, and a different face authentication result image may be projected as face authentication result image 6 to be notified to person 5. For example, in a theme park or the like where text images "OK" and "NG" may disrupt the surrounding atmosphere, an image of a character or the like may be projected onto the vicinity of the feet of person 5 to notify that face authentication has been performed but not the result, and only a security guard may be notified of the face authentication result.

In addition, a correct face authentication result may be reflected in the face authentication result image to be notified to a security guard, and a wrong face authentication result image may be reflected in face authentication result image 6 to be notified to person 5. For example, the image projected by projector 3 can be seen by person 5 himself or herself and other people around person 5; thus, when person 5 is on a watch list, there is a risk that person 5 will run away or confusion will be created. Therefore, even when a person is determined to be invalid, projecting an image indicating "valid" makes it possible to monitor a person on a watch list while preventing escape and confusion.

Alternatively, face authentication apparatus 1 may, for example, allow face authentication result image 6 to be notified to person 5 determined to be invalid to include a text image "NG," and allow the face authentication result image to be notified to a security guard (displayed on the display) to include an image of information or the like indicating that this person 5 is on a watch list.

The device that notifies a security guard is not limited to a display installed at a location other than passage management area A1. The device may be, for example, a terminal such as a smartphone owned by the security guard or a head mounted display worn by the security guard. That is, any device may be used as long as it is difficult for a person passing through passage management area A1 to spy on the device.

Variation 4

Face authentication apparatus 1 may change the display format of face authentication result image 6 to be projected by projector 3 based on the positional relationship between people passing through passage management area A1. For example, face authentication apparatus 1 may change the size or position of face authentication result image 6 so that face authentication result image 6 of a certain person 5 does not overlap with face authentication result image 6 of the next person 5.

In addition, face authentication apparatus 1 may change the sizes and positions of face authentication result images 6 between people 5 at a high density (crowded) and people 5 at a low density (scattered). For example, face authentication apparatus 1 may set the size of face authentication result image 6 of people 5 at a high density smaller than the size of face authentication result image 6 of people 5 at a low density.

In this manner, face authentication apparatus 1 changes the display format of face authentication result image 6 depending on the positional relationship between people 5 passing through passage management area A1 and the density of people 5. This configuration allows person 5 passing through passage management area A and an administrator managing passage through passage management area A1 to easily recognize the face authentication result of person 5.

Variation 5

Camera 2 and projector 3 may be subjected to calibration. For example, calibration may be performed between the coordinates in the image from camera 2 (coordinates in passage management area A1) and the coordinates of projection from the projector.

Variation 6

For a group whose people have the same face authentication result, face authentication apparatus 1 may notify the group of the face authentication result by using a single face authentication result image 6 instead of notifying each person in the group of the face authentication result image 6.

Figure 7:
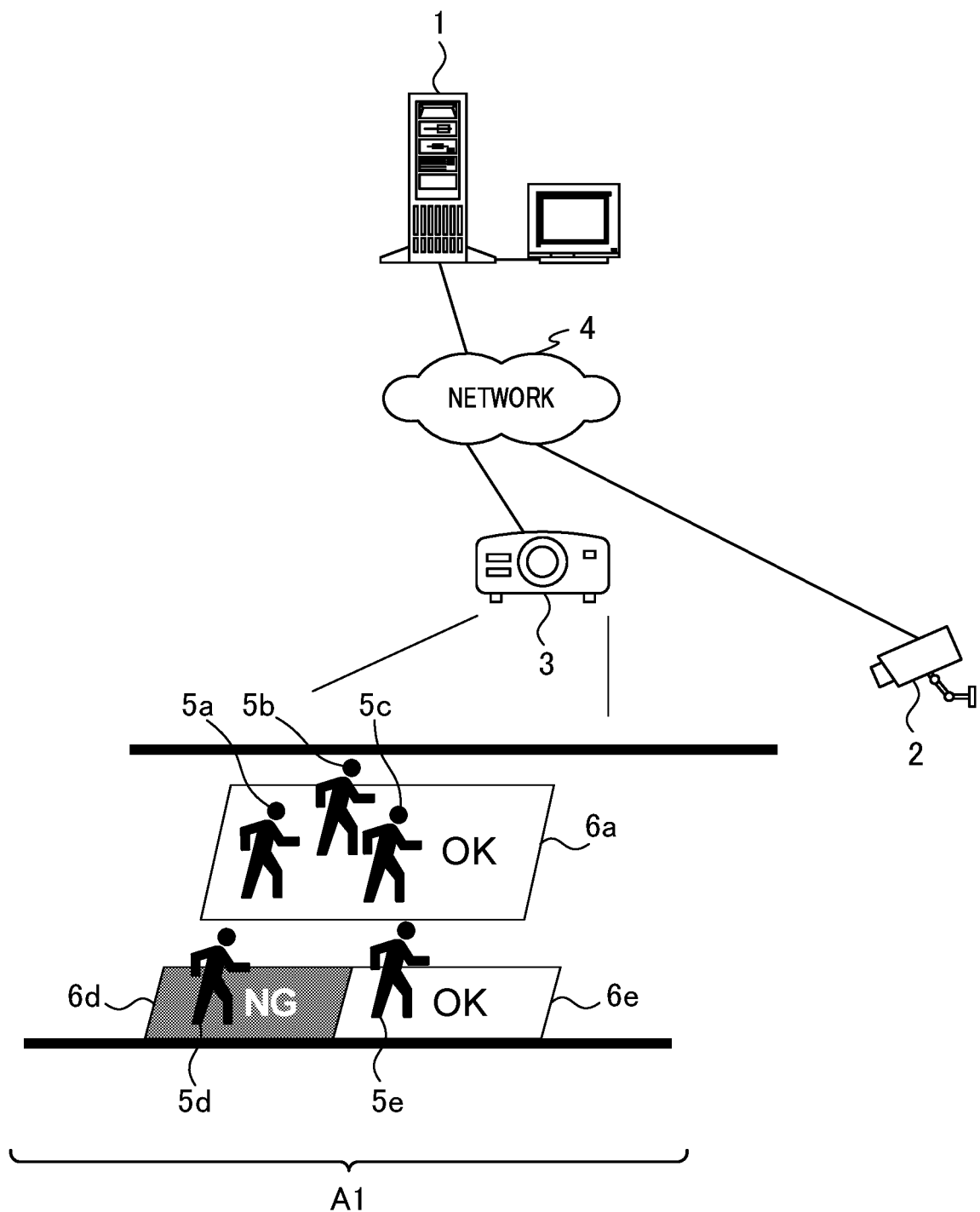
FIG. 7 illustrates an exemplary projection of a face authentication result image according to variation 6.

FIG. 7 illustrates an exemplary projection of face authentication result image 6 according to variation 6. In FIG. 7, the same component elements as in FIG. 1 are given the same reference numerals.

When the face authentication results of a plurality of people 5 (group) located within an area of a predetermined size are the same, face authentication apparatus 1 may notify the group of face authentication result image 6 collectively. That is, for people 5 passing through passage management area A1 in a group (in a cluster), face authentication apparatus 1 may notify people 5 of face authentication result image 6 collectively when they have the same face authentication result.

For example, in FIG. 7, it is assumed that people 5a to 5c are located within an area of a predetermined size. That is, it is assumed that people 5a to 5c are in a group. It is assumed that face authentication apparatus 1 determines that the face authentication results for the group of people 5a to 5c are "valid." In this case, face authentication apparatus 1 generates image data of face authentication result image 6a that collectively notifies the group of people 5a to 5c that the face authentication result is "valid." As a result, one common face authentication result image 6a is projected onto the vicinity of the feet of people 5a to 5c.

In the same manner, face authentication result image 6a may be generated to collectively notify a group of people, who are determined to be invalid as the result of face authentication, that the face authentication result is "invalid."

As described above, face authentication apparatus 1 generates image data in such a way that for a group of people 5a to 5c who have the same face authentication result, a single face authentication result image 6a is projected onto the vicinity of the feet of the group.

People in a party or the like moving through passage management area A1 can thus easily recognize the face authentication result. In addition, an administrator managing passage through passage management area A1 can thus easily recognize the face authentication result of a party or the like moving through passage management area A1.

In addition, various known methods may be applied to determine whether or not people comprise a group. For example, when the movement trajectories of people 5a to 5c are substantially the same, it can be determined that people 5a to 5c comprise a group.

In a group of people 5, when there are a small number of people 5 (for example, less than half of the number of people in the group) who are considered not to belong to the group (for example, because their movement directions are clearly different), face authentication result image 6a for collectively notifying the face authentication result may be generated by ignoring the face authentication results for this small number of people 5. This configuration eliminates the need to divide face authentication result image 6a for a small number of people 5; thus, efficient notification can be performed. Even in the case of employing the configuration, when either "valid" or "invalid" has an important meaning, face authentication result image 6a indicating a result different from that of the main group may be projected only onto the vicinity of the feet of the small number of people 5.

Variation 7

Face authentication apparatus 1 may determine the projection position of face authentication result image 6 by using a background subtraction method.

For example, face authentication apparatus 1 stores in storage 12 image data (hereinafter referred to as background image data) when there is no person 5 in passage management area A1. Face authentication apparatus 1 compares the image data including person 5 which is captured by camera 2 to the background image data stored in storage 12, thereby identifying a floor area, where there is no person 5, in the image data including person 5 which is captured by camera 2. Face authentication apparatus 1 calculates a projection position for projecting face authentication result image 6 in the identified floor area, where there is no person 5.

This configuration allows face authentication apparatus 1 to prevent face authentication result image 6 from being hidden by person 5.

Variation 8

Face authentication apparatus 1 may acquire information regarding the line of sight of person 5 from the face image detected by the face image detection processing. Face authentication apparatus 1 may calculate (adjust) the projection position of face authentication result image 6 based on the acquired information regarding the line of sight. For example, when the line of sight of person 5 is directed slightly ahead the feet of the person 5, face authentication apparatus 1 may change the projection position of face authentication result image 6 to a position slightly ahead the feet of person 5.

In this manner, face authentication apparatus 1 generates image data such that the projection position of face authentication result image 6 is adjusted based on the line of sight of person 5. This configuration allows person 5 to easily visually recognize face authentication result image 6.

When the line of sight of person 5 is blocked by the body of person 5 in front, face authentication apparatus 1 may perform adjustment to use the body of the person 5 in front as the projection position of face authentication result image 6.

Variation 9

A plurality of projectors 3 may be installed at different locations so as to have the same or overlapping projection ranges. For example, two projectors 3 may be installed across passage management area A1. Face authentication apparatus 1 may use a plurality of projectors 3 to project face authentication result image 6 onto the vicinity of the feet of person 5.

For example, face authentication apparatus 1 projects face authentication result image 6 onto the vicinity of the feet of person 5 by using first projector 3 and second projector 3, which are installed at different locations. Even when face authentication result image 6 of a certain person 5 projected by first projector 3 is blocked by another person 5, this configuration allows second projector 3, which projects face authentication result image 6 from a different direction, to project face authentication result image 6 at the feet of the certain person 5.

Installing a plurality of projectors 3 in this manner can reduce the area where face authentication result image 6 cannot be projected.

Other Variations

In the embodiment described above, the face authentication processing is performed inside face authentication apparatus 1. However, an external server or the like may perform the face authentication processing. In this case, face authentication apparatus 1 sends image data received from camera 2 or data obtained by processing such as cutting out the face of person 5 from the image data to a server that performs face authentication processing, and obtains a face authentication result from the server. The processing after obtaining the face authentication result is the same as in the above-described embodiment.

In the embodiment described above, face authentication apparatus 1 calculates the position of person 5 in passage management area A1, based on the image data from camera 2; however, the position of person 5 may be identified by using other methods. For example, the position of person 5 may be estimated by associating the position of the head of person 5 detected by another camera or sensor installed on the ceiling or the like with the position of the face included in the image data from camera 2. Alternatively, people 5 may be provided with a terminal or the like having a positioning function, and the position of each person 5 may be identified based on a signal from the terminal. That is, various techniques known as techniques for estimating the position of a person can be applied to the method of identifying the position of person 5 in the above-described embodiment.

In the embodiment described above, face authenticator 11b performs face authentication processing; however, an external server or the like may perform the face authentication processing. Face authentication apparatus 1 may acquire a face authentication result of the face authentication processing from the external server. Face authentication apparatus 1 may be referred to as a notification apparatus.

In the above-described embodiments, the expressions "processor," "-er," "-or," and "-ar" used for the component elements may be replaced with other expressions such as "circuit (circuitry)," "assembly," "device," "unit," or "module."

Although the embodiments have been described above with reference to the drawings, the present disclosure is not limited to such examples. It is clear that a person skilled in the art is capable of conceiving various changes and modifications within the scope of the claims. It is understood that such changes or modifications also fall within the technical scope of the present disclosure. Further, the component elements in the embodiments may be arbitrarily combined without departing from the spirit of the present disclosure. In addition, variations in the embodiments may be combined arbitrarily.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

This application is entitled to and claims the benefits of Japanese Patent Application No. 2021-114133 dated Jul. 9, 2021, the disclosures of which including the specification, drawings and abstract are incorporated herein by reference in its entirety.

INDUSTRIAL APPLICABILITY

The present disclosure is particularly advantageous for a face authentication system performing face authentication in a location where many people pass through at the same time.

REFERENCE SIGNS LIST

1 Face authentication apparatus
2 Camera
3 Projector
5 Person
6 Face authentication result image
11 Controller
11a Position calculator
11b Face authenticator
11c Image data generator
12 Storage
13 Communicator
13a Image data receiver
13b Image data transmitter
14 Input
15 Output
A1 Passage management area

The invention claimed is:
1. A notification apparatus, comprising:
a generator that generates image data of a face authentication result image to be projected onto a vicinity of a foot of a person passing through a passage management area, the face authentication result image representing a face authentication result of the person passing through the passage management area, the face authentication result being obtained based on image data from a camera capturing an image of the passage management area; and
a transmitter that transmits the generated image data to a projector;
wherein the generator performs facial recognition processing on people passing through the passage management area, and determines whether or not to generate the image data of the person based on whether a number of people passing through the passage management area exceeds or does not exceed a predetermined threshold, the person being determined to be valid in face authentication processing for the facial recognition processing;
wherein when the number of people passing through the passage management area is less than or equal to the predetermined threshold, the generator generates both a first image data for a first set of people that pass the facial recognition processing and a second image data for a second set of people that fail the facial recognition processing; and
wherein the generator determines not to generate the image data related to the person and the first image data when the number of people passing through the passage management area exceeds the predetermined threshold.
2. The notification apparatus according to claim 1, wherein the generator generates the image data such that the face authentication result image includes an image indicating a course after passing through the passage management area.
3. The notification apparatus according to claim 1, wherein the generator generates the image data such that the face authentication result image includes an image indicating a reason of invalidity for the person determined to be invalid in the face authentication processing.
4. The notification apparatus according to claim 1, wherein the generator changes a size or a display position of the face authentication result image based on a positional relationship of the person passing through the passage management area.
5. The notification apparatus according to claim 1, wherein for a group with the face authentication result being identical, the generator generates the image data in such a way that the face authentication result image to be projected onto a vicinity of feet of the group is a single face authentication result image.
6. The notification apparatus according to claim 1, wherein the generator generates the image data such that a projection position of the face authentication result image is adjusted based on a line of sight of the person passing through the passage management area.
7. A notification method, comprising:
generating image data of a face authentication result image to be projected onto a vicinity of a foot of a person passing through a passage management area, the face authentication result image representing a face authentication result of the person passing through the passage management area, the face authentication result being obtained based on image data from a camera capturing an image of the passage management area; and transmitting the generated image data to a projector;

wherein the generator performs facial recognition processing on people passing through the passage management area, and determines whether or not to generate the image data of the person based on whether a number of people passing through the passage management area exceeds or does not exceed a predetermined threshold, the person being determined to be valid in face authentication processing for the facial recognition processing;

wherein when the number of people passing through the passage management area is less than or equal to the predetermined threshold, the generator generates both a first image data for a first set of people that pass the facial recognition processing and a second image data for a second set of people that fail the facial recognition processing; and wherein the generator determines not to generate the image data related to the person and the first image data when the number of people passing through the passage management area exceeds the predetermined threshold.

8. The notification apparatus according to claim 1, wherein the generator determines whether or not to generate the image data of the person based on the number of people passing through the passage management area, the person being determined to be invalid in the face authentication processing.

9. A notification apparatus, comprising:

a generator that generates image data of a face authentication result image to be projected onto a vicinity of a foot of a person passing through a passage management area, the face authentication result image representing a face authentication result of the person passing through the passage management area, the face authentication result being obtained based on image data from a camera capturing an image of the passage management area; and a transmitter that transmits the generated image data to a projector;

wherein the generator determines whether or not to generate the image data of the person based on the number of people passing through the passage management area, the person being determined to be valid in face authentication processing, and wherein the generator determines not to generate the image data of the person determined to be valid in the face authentication processing when the number of the people passing through the passage management area exceeds a predetermined threshold.

\* \* \* \* \*